US012267658B2

(12) United States Patent
Hui et al.

(10) Patent No.: US 12,267,658 B2
(45) Date of Patent: Apr. 1, 2025

(54) MULTIFUNCTIONAL SOUNDING DEVICE

(71) Applicant: AAC Technologies (Nanjing) Co., Ltd., Nanjing (CN)

(72) Inventors: Yao Hui, Shenzhen (CN); Jiujian Liu, Shenzhen (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 213 days.

(21) Appl. No.: 18/091,373

(22) Filed: Dec. 30, 2022

(65) Prior Publication Data

US 2024/0089661 A1 Mar. 14, 2024

Related U.S. Application Data

(63) Continuation of application No. PCT/CN2022/126304, filed on Oct. 20, 2022.

(30) Foreign Application Priority Data

Sep. 13, 2022 (CN) .......................... 202211111102.1

(51) Int. Cl.
*H04R 9/02* (2006.01)

(52) U.S. Cl.
CPC .................................... *H04R 9/025* (2013.01)

(58) Field of Classification Search
CPC ........ H04R 9/025; H04R 9/063; H04R 1/026; H04R 2209/024; H04R 2209/041
See application file for complete search history.

(56) References Cited

U.S. PATENT DOCUMENTS 12,003,937 B2 * 6/2024 Chen ........................ H04R 1/06
2022/0210573 A1 * 6/2022 Xiao ...................... H04R 1/026

* cited by examiner

*Primary Examiner* — Sunita Joshi
(74) *Attorney, Agent, or Firm* — W&G Law Group

(57) ABSTRACT

A multifunctional sounding device is provided, including a housing, a sounding unit, and a motor assembly including a coil unit fixed to the housing. The sounding unit includes a basin frame, a vibration system and a magnetic circuit system, the vibration system is driven by the magnetic circuit system to vibrate in a first direction, the magnetic circuit system is elastically connected to the housing through elastic arms and has a through hole at a central position. The motor assembly is accommodated in the through hole, and the coil unit is spaced apart from the magnetic circuit system and drives the magnetic circuit system to vibrate in a second direction. The multifunctional sounding device has a small overall thickness and size, a strong driving force of the motor assembly and a small influence on the driving force of the magnetic circuit system, and excellent acoustic and vibration performance.

9 Claims, 6 Drawing Sheets

MULTIFUNCTIONAL SOUNDING DEVICE

CROSS-REFERENCE TO RELATED APPLICATION

The present application is a continuation of PCT Patent Application No. PCT/CN2022/126304, filed Oct. 20, 2022, which claims priority to Chinese patent application No. 202211111102.1, filed Sep. 13, 2022, each of which is incorporated by reference herein in its entirety.

TECHNICAL FIELD

Embodiments of the present invention relate in general to electroacoustic conversion technology, and more particularly to a multifunctional sounding device applied in electronic loudspeakers.

BACKGROUND

With the advent of the mobile Internet era, the number of smart mobile devices is increasing. Among various mobile devices, mobile phone is undoubtedly the most common and portable mobile terminal device. Generally, functions of the mobile phone are extremely diverse, e.g., high-quality music functions and vibration functions. Therefore, a multifunctional sounding device having functions like vibration and playing sound is widely applied in current intelligent mobile devices.

A multifunctional sounding device in the related art includes a housing, and a sounding unit and a motor assembly accommodated in the housing. The sounding unit includes a basin frame, and a vibration system and a magnetic circuit system having a magnetic gap respectively fixed to the basin frame. The motor assembly is attached to a side of the magnetic circuit system away from the vibration system.

However, in the related art, the sounding unit and the motor assembly in the multifunctional sounding device are able to be independently controlled, but a thickness of the multifunctional sounding device is increased since the motor assembly is stacked below the sounding unit, thus it is difficult to realize lightening and thinning of the multifunctional sounding device. In addition, respective magnetic steel plates of the sounding unit and the motor assembly are not in the same plane, resulting in respective magnetic field driving forces interfering with each other, so that the number of magnetic steel plates in the multifunctional sounding device is large, resulting in failure of miniaturization due to the large volume, thereby making acoustic and vibration performance of the multifunctional sounding device poor.

Therefore, it is desired to provide a new multifunctional sounding device to solve the above technical problems.

SUMMARY

An object of the present invention is to provide a multifunctional sounding device having a small overall thickness and size, a strong driving force of a motor assembly and a small influence on the driving force of a magnetic circuit system, and excellent acoustic and vibration performance.

Some embodiments of the present invention provide a multifunctional sounding device including a housing having an accommodation space and a sounding unit fixedly accommodated in the accommodation space, the sounding unit includes a basin frame and a vibration system and a magnetic circuit system having a magnetic gap respectively fixed to the basin frame, the vibration system is driven by the magnetic circuit system to vibrate and sound in a first direction. The magnetic circuit system is elastically connected to the housing by a plurality of elastic arms, and the magnetic circuit system has a through hole at a central position; and the multifunctional sounding device further includes a motor assembly accommodated in the through hole, the motor assembly includes a coil unit fixed to the housing, and the coil unit is spaced apart from the magnetic circuit system and drives the magnetic circuit system to vibrate in a second direction, wherein the first direction is perpendicular to the second direction.

In some embodiments, the magnetic circuit system comprises a magnetic yoke fixed to the basin frame, a main magnetic steel plate fixed to the magnetic yoke, two secondary magnetic steel plates disposed on opposite sides of the main magnetic steel plate and spaced apart from the main magnetic steel plate to form the magnetic gap, a first soft magnetic steel plate in an annular shape, and a second soft magnetic steel plate in an annular shape. A magnetic yoke center hole penetrating through the magnetic yoke is provided at a central position of the magnetic yoke; the main magnetic steel plate is in an annular shape and encloses a guide space, the main magnetic steel plate is fixed to the magnetic yoke and disposed around the magnetic yoke center hole, and the guide space communicates with the magnetic yoke center hole to collectively define the through hole; the secondary magnetic steel plates are disposed on opposite sides of the magnetic yoke; and the first soft magnetic steel plate is stacked and fixed on a side of the main magnetic steel plate away from the magnetic yoke, and the second soft magnetic steel plate is stacked and fixed on a side of a respective secondary magnetic steel plate away from the magnetic yoke.

In some embodiments, the magnetic yoke further includes a magnetic yoke body and two elastic arms respectively extending from opposite sides of the magnetic yoke body, the magnetic yoke center hole is disposed in the magnetic yoke body, and both the main magnetic steel plate and the secondary magnetic steel plates are fixed to the magnetic yoke body. The elastic arms are elastically connected to the housing and suspend the magnetic yoke body in the accommodation space.

In some embodiments, the magnetic circuit system further includes two auxiliary magnetic steel plates fixed on the other opposite sides of the magnetic yoke, the two auxiliary magnetic steel plates are respectively disposed on the other opposite sides of the main magnetic steel plate at intervals and correspond to positions of the two elastic arms, and the second soft magnetic steel plate is further stacked and fixed on a side of a respective auxiliary magnetic steel plate away from the magnetic yoke.

In some embodiments, the motor assembly includes a plurality of motor magnetic steel plates fixed on a side of the magnetic yoke body away from the housing, the plurality of motor magnetic steel plates are accommodated in the guide space, and the main magnetic steel plates are disposed around the plurality of motor magnetic steel plate.

In some embodiments, two motor magnetic steel plates are provided, the main magnetic steel plate is in a rectangular shape, and the two motor magnetic steel plates are respectively fixed on opposite sides of a short axis or a long axis of the main magnetic steel plate.

In some embodiments, the coil unit includes an iron core fixed to the housing and a coil wound around the iron core, the iron core is fixed to the housing and penetrates through the magnetic yoke center hole to be at least partially accommodated in the guide space. The coil is spaced apart from the motor magnetic steel plates and the main magnetic steel plate, respectively, and drives the motor magnetic steel plates and the main magnetic steel plate to vibrate in the second direction. The motor assembly further includes a plurality of mass blocks fixed to the magnetic circuit system, and the plurality of mass blocks are fixed to one or both of the magnetic yoke and the second soft magnetic steel plate.

In some embodiments, the vibration system includes a diaphragm fixed to the basin frame, a voice coil inserted into the magnetic gap to drive the diaphragm to vibrate and sound, and a skeleton configured to fix the voice coil to the diaphragm. The voice coil is in a rectangular shape, and a length difference between a length of a long axis of the voice coil and a length of a long axis of the main magnetic steel plate is greater than or equal to a maximum amplitude of a respective motor magnetic steel plate.

In some embodiments, the vibration system further includes a plurality of elastic members, one end of a respective elastic member is connected to the basin frame or the housing, and the other end of the respective elastic member is connected to the voice coil.

In some embodiments, the main magnetic steel plate has an annular structure having a same thickness.

In the embodiments of the present invention, the multifunctional sounding device is provided with a through hole at a central position of the magnetic circuit system. Since magnetic flux lines in the middle region of the magnetic circuit system are less, magnetic energy product utilization of the magnetic circuit system is improved after the through hole is provided in the middle region of the magnetic circuit system, so that the acoustic performance of the multifunctional sounding device is good. The motor assembly is accommodated in the through hole, so that the overall thickness of the multifunctional sounding device is small, which is conducive to lighting and thinning of the multifunctional sounding device. The coil unit of the motor assembly is fixed to the housing, the coil unit is spaced apart from the magnetic circuit system and drives the magnetic circuit system to vibrate in the second direction, and the magnetic steel plate of the magnetic circuit system is used as the magnetic steel plate for providing driving force of the motor assembly, without adding additional magnetic steel plates, so that the magnetic steel plate of the magnetic circuit system is able to be reused, thereby enhancing the driving force of the motor assembly and making the vibration performance of the multifunctional sounding device good. In addition, the first direction is perpendicular to the second direction, so that the coil unit of the motor assembly has less influence on the driving force of the magnetic circuit system of the sounding unit in the first direction and less interference with each other, thereby achieving good acoustic performance and vibration performance of the multifunctional sounding device in the present invention.

BRIEF DESCRIPTION OF THE DRAWINGS

In order to more clearly illustrate the technical solutions in the embodiments of the present invention, the accompanying drawings required to be used in the description of the embodiments are briefly described below. It is apparent that the accompanying drawings in the following description are only some embodiments of the present invention, and those of ordinary skill in the art are able to obtain other drawings from these drawings without creative effort.

DETAILED DESCRIPTION OF THE EMBODIMENTS

The technical solutions in the embodiments of the present invention are clearly and completely described in the following with reference to the accompanying drawings in the embodiments of the present invention. It is apparent that the described embodiments are only a part of but not all of the embodiments of the present invention. All other embodiments obtained, based on the embodiments of the present invention, by those of ordinary skill in the art without creative effort fall within the protection scope of the present invention.

Figure 1:
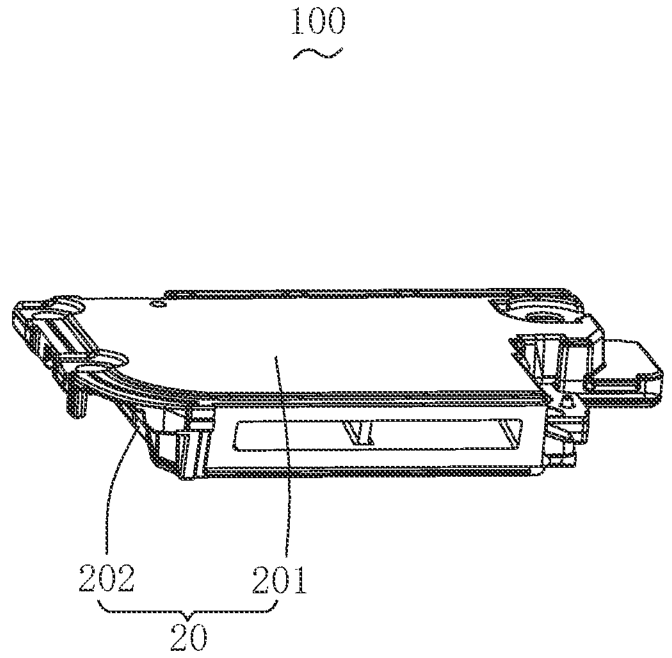
FIG. 1 is a schematic diagram of a three-dimensional structure of a multifunctional sounding device according to the present invention.
Figure 2:
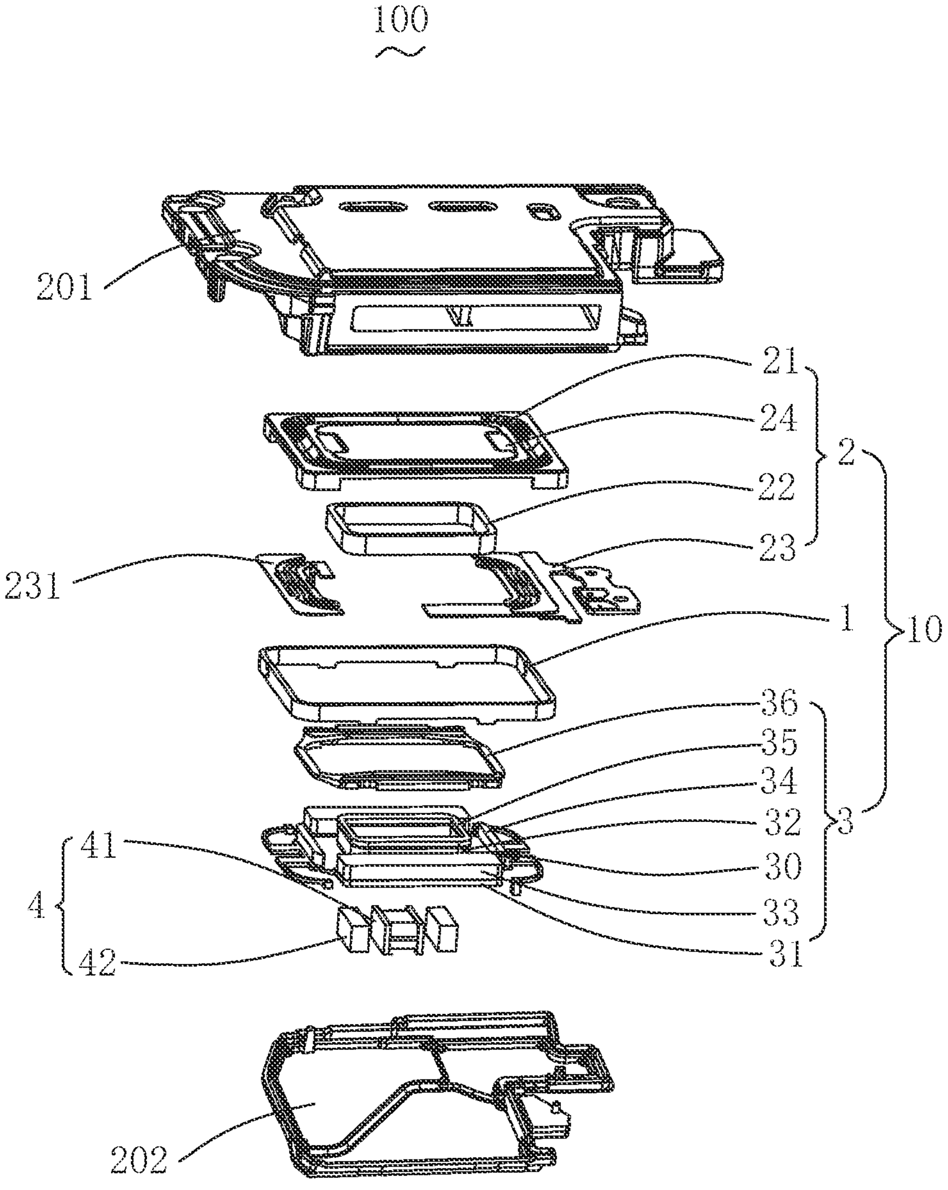
FIG. 2 is an exploded view of a three-dimensional structure of a multifunctional sounding device of the present invention.
Figure 3:
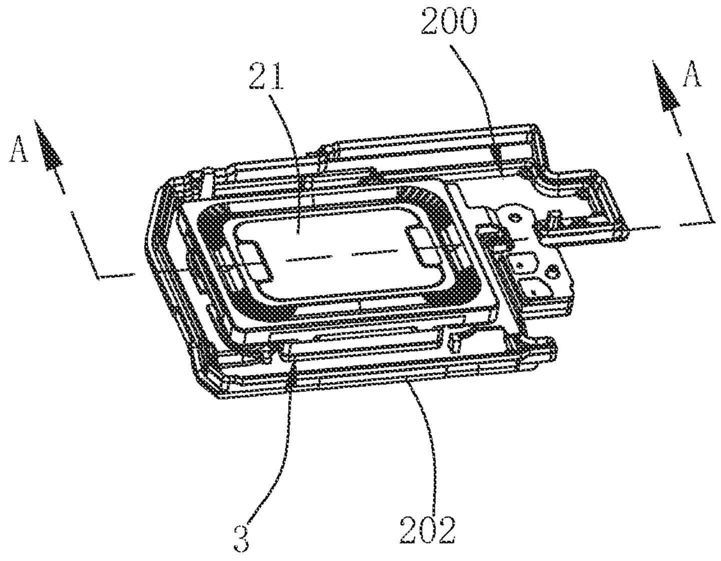
FIG. 3 is an exploded view of a three-dimensional structure of a multifunctional sounding device with a part of a housing removed according to the present invention.
Figure 4:
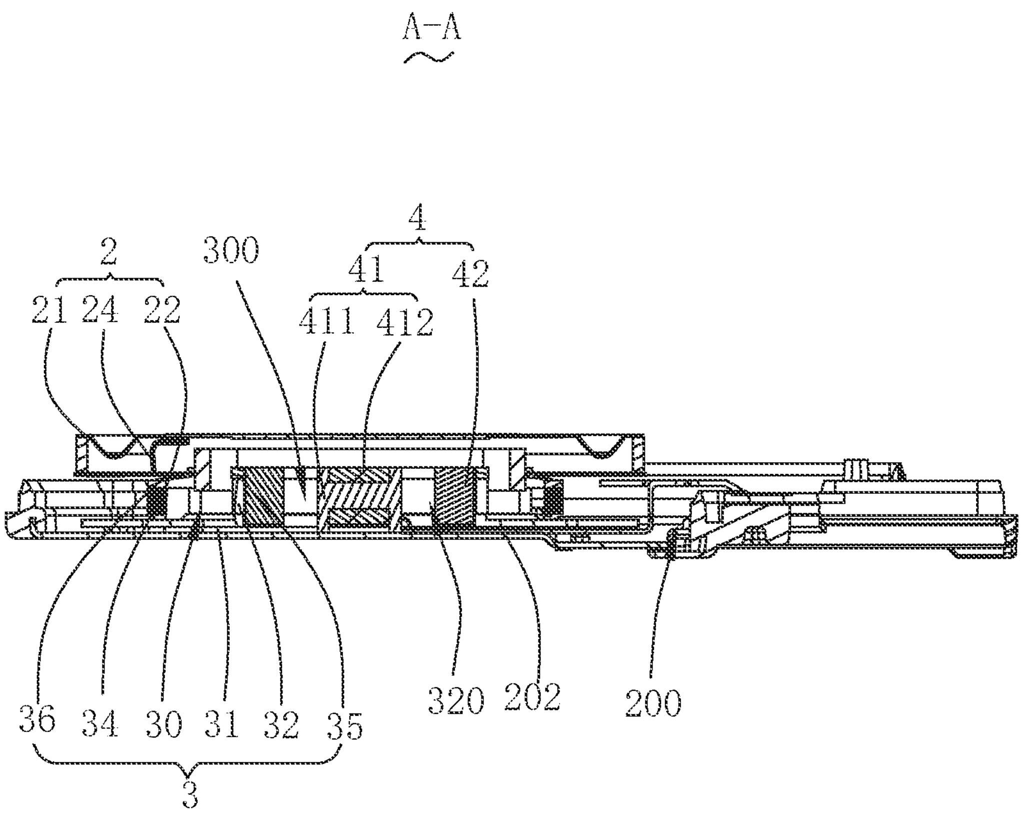
FIG. 4 is a sectional view taken along line A-A in FIG. 3.
Figure 5:
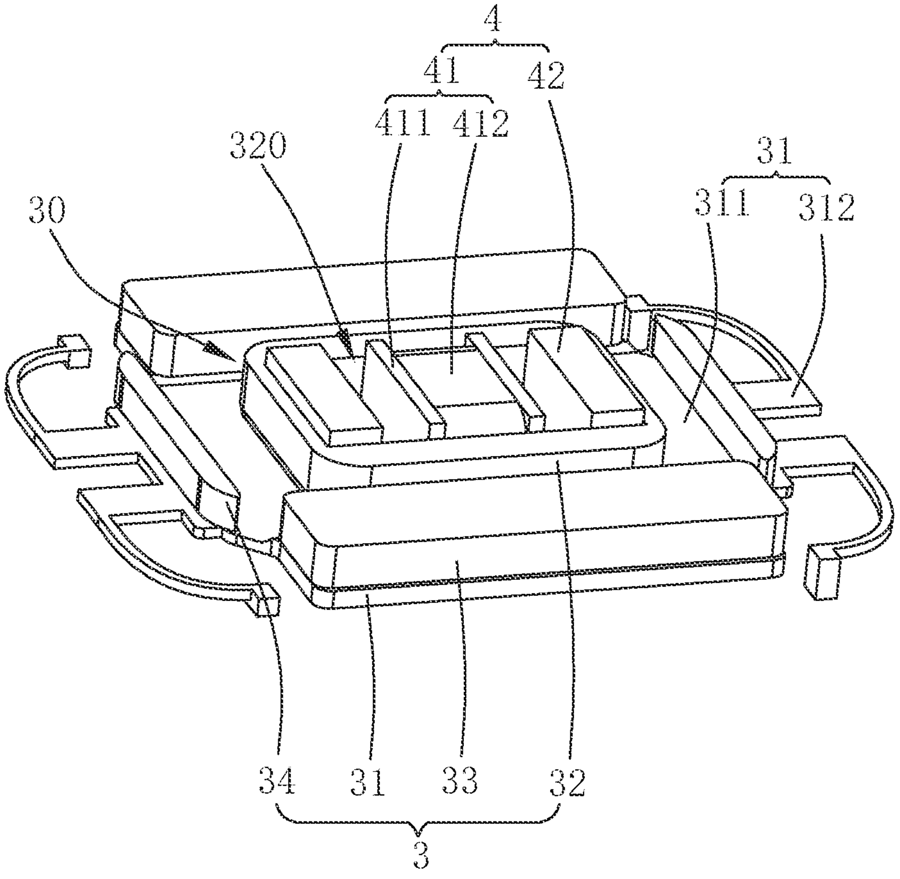
FIG. 5 is a schematic view of a three-dimensional assembly structure of a magnetic circuit system and a motor assembly of a multifunctional sounding device according to the present invention.
Figure 6:
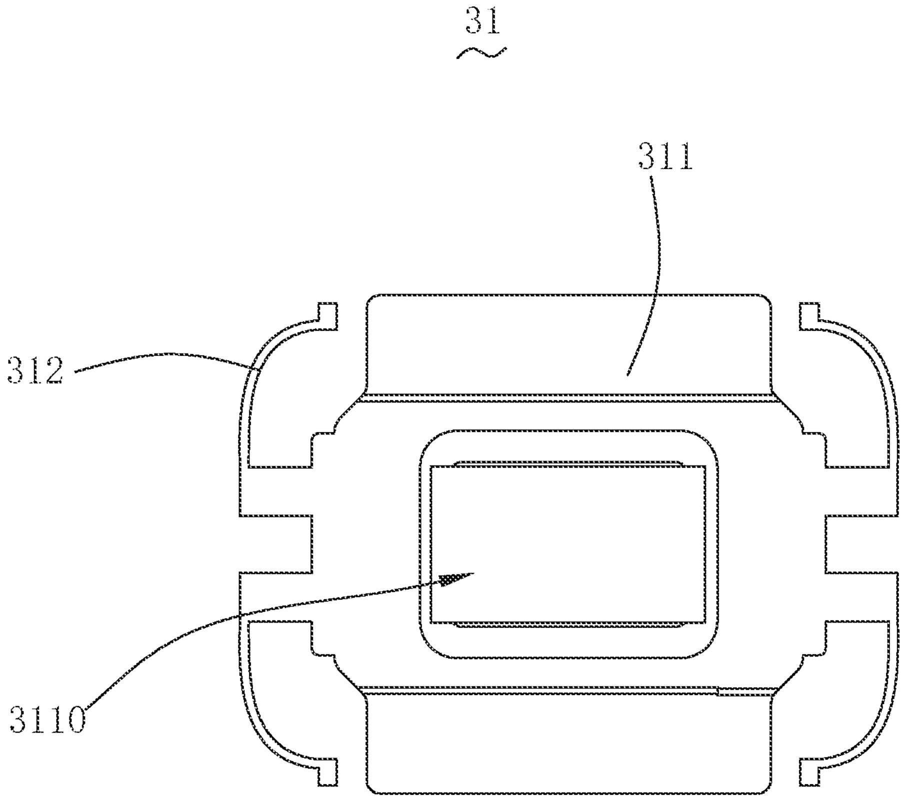
FIG. 6 is a schematic structural diagram of a magnetic yoke of a multifunctional sounding device according to the present invention.

Some embodiments of the present invention provide a multifunctional sounding device 100. Referring to FIG. 1 to FIG. 6, the multifunctional sounding device 100 includes a housing 20 having an accommodation space 200, and a sounding unit 10 and a motor assembly 4 fixed in the accommodation space 200.

The housing includes an upper cover 201, and a lower cover 202 which is provided on the upper cover 201 and define the accommodation space 200 together with the upper cover 201. In some embodiments, the housing 20 may also be integrally formed.

The sounding unit 10 includes a basin frame 1, and a vibration system 2 and a magnetic circuit system 3 having a magnetic gap 30 fixed to the basin frame 1, respectively. The vibration system 2 is driven by the magnetic circuit system 3 to vibrate and sound in a first direction. In some embodiments, the first direction is a thickness direction of the sounding unit 10.

The vibration system 2 includes a diaphragm 21 fixed to the basin frame 1, a voice coil 22 inserted into the magnetic gap 30 to drive the diaphragm 21 to vibrate and sound, an elastic support assembly 23 connected to a side of the voice coil 22 away from the diaphragm 21, and a skeleton 24 configured to fix the voice coil 22 to the diaphragm 21. The elastic support assembly 23 may be directly fixed to the voice coil 22 or fixed to the voice coil 22 through the skeleton 24. The elastic support assembly 23 is provided to avoid lateral swing when the voice coil is vibrating, so that the multifunctional sounding device 100 has good stability.

In some embodiments, the skeleton 24 is made of a metal material, so as to achieve a rigid connection between a spherical top of the diaphragm 21 and the voice coil 22.

The magnetic circuit system 3 drives the vibration system 2 to vibrate and sound. A through hole 300 is provided at a central position of the magnetic circuit system. The motor assembly 4 is accommodated in the through hole 300. Since magnetic flux lines in the middle region of the magnetic circuit system 3 are less, magnetic energy product utilization of the magnetic circuit system 3 is improved after the through hole 300 is provided in the middle region of the magnetic circuit system 3, so that the acoustic performance of the multifunctional sounding device 100 is good.

The magnetic circuit system 3 includes a magnetic yoke 31, a main magnetic steel plate 32, and a plurality of secondary magnetic steel plates 33.

The magnetic yoke 31 is fixed to the basin frame 1.

The magnetic yoke 31 includes a magnetic yoke body 311, two elastic arms 312 extending from opposite sides of the magnetic yoke body 311, and a magnetic yoke center hole 3110 penetrating through the magnetic yoke body 311.

The magnetic yoke body 311 is in a rectangular shape.

The magnetic yoke center hole 3110 penetrating through the magnetic yoke 31 is provided at a central position of the magnetic yoke 31. The magnetic yoke center hole 3110 is located in the magnetic yoke body 311.

The magnetic circuit system 3 is elastically connected to the housing 20 by the elastic arms 312. Two elastic arms 312 are provided on opposite sides of a short axis of the magnetic yoke body 311, the elastic arms 312 are fixed to the housing and suspend the magnetic yoke body 311 in the accommodation space 200. This structure increases anti-swing performance of the magnetic yoke 31, thereby improving the vibration performance of the multifunctional sounding device 100 in the present invention.

The magnetic yoke center hole 3110 is located in the middle region of the magnetic yoke body 311, and the magnetic yoke center hole 3110 communicates with the accommodation space 200.

The main magnetic steel plate 32 is fixed to the magnetic yoke 31. The main magnetic steel plate is in an annular shape and encloses a guide space 320. The main magnetic steel plate 32 is fixed to the magnetic yoke body 311 and disposed around the magnetic yoke center hole 3110. The main magnetic steel plate 32 in the annular shape is conducive to increasing the space of the magnetic gap 30 of the magnetic circuit system 3 and improving the acoustic performance of the multifunctional sounding device 100. The guide space 320 communicates with the magnetic yoke center hole 3110 to collectively define the through hole 300. The guide space 320 is configured to accommodate the motor assembly 4, such that the motor assembly 4 is mounted in the guide space 320, thereby making the overall thickness of the multifunctional sounding device 100 small and facilitating the lighting and thinning application of the multifunctional sounding device 100.

In some embodiments, the main magnetic steel plate 32 is an annular structure having the same thickness. That is, cross-sectional areas of various portion of the main magnetic steel plate 32 along its circumferential direction are the same. Because the magnetic flux lines in the middle region of the main magnetic steel plate 32 are small, the magnetic flux lines in the middle region of the main magnetic steel plate 32 are able to be removed without affecting the acoustic performance of the sounding unit 10. In some embodiments, the main magnetic steel plate 32 is in a rectangular shape. The main magnetic steel plate 32 is surrounded by four pieces of magnetic steel plates, and when widths of the four pieces of magnetic steel plates tend to be equal, the utilization rate of the magnetic energy is high, so that the magnetic energy product utilization of the main magnetic steel plate 32 is improved, and the acoustic performance of the multifunctional sounding device 100 is good.

Two secondary magnetic steel plates 33 are provided on opposite sides of the main magnetic steel plate 32 and spaced apart from the main magnetic steel plate 32 to form the magnetic gap 30. In some embodiments, the main magnetic steel plate 32 is in a rectangular shape. The two secondary magnetic steel plates 33 are respectively disposed on opposite sides of a long axis of the main magnetic steel plate 32. Specifically, the secondary magnetic steel plates are disposed on the other opposite sides of the magnetic yoke body 311.

The motor assembly 4 is accommodated in the guide space 320. Specifically, the motor assembly 4 includes a coil unit 41 and a motor magnetic steel plate 42.

The coil unit 41 is fixed to the housing 20. In some embodiments, the coil unit is fixed to the lower cover 202.

The coil unit 41 is spaced apart from the magnetic circuit system 3 and drives the magnetic circuit system 3 to vibrate in a second direction. The first direction is perpendicular to the second direction. Because the first direction and the second direction are perpendicular to each other, the coil unit 41 of the motor assembly 4 has less influence on the driving force of the magnetic circuit system 3 of the sounding unit 10 in the first direction and less interference with each other, so that the multifunctional sounding device 100 in the present invention has good acoustic performance and vibration performance.

Specifically, the coil unit 41 includes an iron core 411 fixed to the housing and a coil 412 wound around the iron core 411. The iron core 411 is fixed to the housing 20 and penetrates through the magnetic yoke center hole 3110 to be at least partially accommodated in the guide space 320. The coil 412 is spaced apart from the motor magnetic steel plates 42 and the main magnetic steel plate 32, respectively, and drives the motor magnetic steel plates 42 and the main magnetic steel plate 32 to vibrate in the second direction. The magnetic steel plates of the magnetic circuit system 3 are used as the magnetic steel plates for providing driving force of the motor assembly 4, without adding additional magnetic steel plates, so that the magnetic steel plates of the magnetic circuit system 3 are able to be reused, thereby enhancing the driving force of the motor assembly 4 and making the vibration performance of the multifunctional sounding device 100 good.

In some embodiments, the number of turns of the coil 412 exceeds 100, the core 411 and the coil 412 together form an electromagnet, and the coil unit 41 generates a magnetic field driving force when energized. Specifically, the coil unit 41 is spaced apart from the main magnetic steel plate 32 and drives the main magnetic steel plate 32 to reciprocate in a direction perpendicular to a vibration direction of the vibration system 2. This structure causes a vibration direction of the main magnetic steel plate 32 driven by the vibration system 2 to be different from a vibration direction of the main magnetic steel plate 32 driven by the coil unit 41, thereby reducing mutual interference, so that the multifunctional sounding device 100 in the present invention achieves good acoustic performance and vibration performance. The coil 412 and the voice coil 22 are independently controlled by different external signals, respectively. The sounding unit 10 loads a music signal or a voice signal, and the motor assembly 4 loads a vibration signal.

The motor magnetic steel plates 42 are fixed on a side of the magnetic yoke body 311 away from the housing 20. The motor magnetic steel plates 42 are accommodated in the guide space 320, and the main magnetic steel plate 32 is disposed around the motor magnetic steel plates 42.

Both the motor magnetic steel plates 42 and the coil unit 41 are accommodated in the guide space 320. The coil unit 41 and the motor magnetic steel plates 42 in the guide space 320 are spaced apart from each other to form a vibration space for vibration of the motor assembly 4, i.e., vibration of the motor magnetic steel plates 42. A width of the vibration space is greater than or equal to a maximum amplitude of a motor magnetic steel plate 42, so that reliability of the vibration of the multifunctional sounding device 100 is high.

Two motor magnetic steel plates 42 are provided, and the two motor magnetic steel plates 42 are respectively fixed on two opposite inner surfaces of the main magnetic steel plate 32. The motor magnetic steel plates 42 and a portion of the main magnetic steel plate 32 fixed to the motor magnetic steel plates 42 are formed as a magnetic steel plate group which provides a driving force of the motor assembly 4. The magnetic steel plate group forms a magnetic circuit and forms a vibration unit, and a weight of the vibration unit is also increased by the superimposed weight of the motor magnetic steel plates 42 and the main magnetic steel plate 32, thereby enhancing the driving force of the motor assembly 4, so as to make the vibration performance of the multifunctional sounding device 100 good. The driving force of the motor assembly 4 of the multifunctional sounding device 100 in the present invention is increased by more than 80% compared to conventional multifunctional sounding devices. In addition, since both the motor magnetic steel plates 42 and the main magnetic steel plate 32 are disposed on the same plane, and the motor magnetic steel plates 42 have less influence on the driving force of the magnetic circuit system 3 of the sounding unit 10 and less interference with each other, the multifunctional sounding device 100 in the present invention achieves good acoustic performance and vibration performance.

The two motor magnetic steel plates 42 are respectively fixed on opposite sides of a short axis or a long axis of the main magnetic steel plate 32. In some embodiments, the two motor magnetic steel plates 42 are respectively fixed on opposite sides of the short axis of the main motor magnetic steel plate 32. This structure causes the coil unit 41 of the motor assembly 4 to drive the motor magnetic steel plates 42 to vibrate in a direction of the long axis of the main magnetic steel plate 32. The sounding unit 10 vibrates in a thickness direction of the sounding unit 10, thus the vibration directions of the sounding unit 10 and the motor magnetic steel plates 42 are different, so that mutual interference is reduced, thereby achieving good acoustic performance and vibration performance of the multifunctional sounding device 100 in the present invention. In some embodiments, in order to better suspend the magnetic yoke body 311 in the housing space 200, the motor magnetic steel plates 42 is further provided with a spring connected to the housing. The spring is in a 'V' shape or 'C' shape, and a spring structure is provided in a part of a respective motor magnetic steel plate 42 so that the anti-swing performance of the magnetic yoke 31 is increased, thereby improving the vibration performance of the multifunctional sounding 100 device in the present invention.

In some embodiments, the voice coil 22 is in a rectangular shape. That is, the voice coil 22 is an elongated voice coil. A length difference between a length of a long axis of the voice coil 22 and a length of the long axis of the main magnetic steel plate 32 is greater than or equal to a maximum amplitude of the motor magnetic steel plate 42. That is, the length of the long axis of the voice coil 22 is greater than or equal to a sum of the length of the long axis of the main magnetic steel plate 32 and 2 times of the vibration amplitude of the motor magnetic steel plate 42. Since the inner side of the voice coil 22 surrounds the main magnetic steel plate 32 and is spaced apart from the main magnetic steel plate 32, i.e., the voice coil is disposed in the magnetic gap 30 and the inner side of the voice coil 22 surrounds the main magnetic steel plate 32, the length of the long axis of the voice coil 22 is set to an elongated type to help ensure that, in the case where the main magnetic steel plate 32 is driven by the coil unit 41 to vibrate in the direction of the long axis of the main magnetic steel plate 32, the main magnetic steel plate 32 in a maximum amplitude range of the vibration of the motor magnetic steel plate 42 does not affect the vibration of the voice coil 22 in the direction of the thickness of the sounding unit 10, thereby achieving good acoustic performance and vibration performance of the multifunctional sounding device 100 in the present invention.

In some embodiments, the magnetic circuit system 3 further includes two auxiliary magnetic steel plates 34 fixed to opposite sides of the magnetic yoke 31. The two auxiliary magnetic steel plates 34 are spaced apart from the main magnetic steel plate 32 on opposite sides of the main magnetic steel plate 32 and correspond to the positions of the two elastic arms 312. Specifically, the two auxiliary magnetic steel plates 34 are spaced apart from the main magnetic steel plate 32 and disposed on opposite sides of the short axis of the main magnetic steel plate 32. Since the magnetic steel plate group formed of the main magnetic steel plate 32 and the motor magnetic steel plates 42 repeatedly vibrates in the direction along the long axis of the main magnetic steel plate 32, the magnetic field driving forces on the opposite sides of the short axis of the main magnetic steel plate 32 are unbalanced and asymmetric, which affects the pure sound of the multifunctional sounding device 100. Therefore, the two auxiliary magnetic steel plates 34 are disposed on the opposite sides of the short axis of the main magnetic steel plate 32, which improves the magnetic field driving forces on the opposite sides of the short axis of the main magnetic steel plate 32, thereby achieving good acoustic performance of the multifunctional sounding device 100 in the present invention. In addition, the anti-swing performance of the motor assembly 4 is increased, thereby improving the vibration performance of the multifunctional sounding 100 device in the present invention.

In some embodiments, the magnetic circuit system 3 further includes a first soft magnetic steel plate 35 in an annular shape and a second soft magnetic steel plate 36 in an annular shape. The first soft magnetic steel plate 35 is stacked and fixed on a side of the main magnetic steel plate 32 away from the magnetic yoke 31. The second soft magnetic steel plate 36 is stacked and fixed on sides of the secondary magnetic steel plates 33 away from the magnetic yoke 31 and sides of the secondary magnetic steel plates 34 away from the magnetic yoke 31.

In some embodiments, the motor assembly 4 further includes a plurality of mass blocks (not shown) fixed to the magnetic circuit system 3. The plurality of mass blocks are configured for counterweight to increase a weight of the vibration unit formed by the motor magnetic steel plates 42 and the main magnetic steel plate 32, so as to increase the vibration amplitude of the vibration unit, so that the motor assembly 4 outputs a higher acceleration, thereby improving the vibration performance of the multifunctional sounding device 100 in the present invention.

The plurality of mass blocks are fixed to one or both of the magnetic yoke 31 and the second soft magnetic steel plate 36. In some embodiments, the mass blocks are fixed to the magnetic yoke 31. Two mass blocks are provided, which are respectively disposed on opposite sides of the short axis of the main magnetic steel plate 32.

In some embodiments, in order to improve the vibration stability of the multifunctional sounding device 100 in the present invention, the vibration system 2 is provided with a plurality of elastic members 231. Specifically, the elastic support assembly 23 includes the elastic members 231. One end of a respective elastic member 231 is connected to the basin frame 1 or the housing 20. The other end of the respective elastic member 231 is connected to the voice coil 22. The arrangement of the elastic member 231 avoids lateral swing when the voice coil 22 is vibrating, and increases the vibration performance of the voice coil 22, so that the multifunctional sounding device 100 has good stability. The elastic member 231 is a flexible circuit board for supplying power to the voice coil 22, which prevents lead wires of the voice coil 22 from being disconnected, so that the multifunctional sounding device 100 has good stability.

In some embodiments, two elastic members 231 are provided, which are disposed on opposite sides of the short axis of the magnetic circuit system 3, respectively.

In some embodiments, when the coil unit 41 drives the main magnetic steel plate 32 to reciprocate in a direction perpendicular to the vibration direction of the vibration system 2, the elastic members 231 simultaneously increases the anti-swing performance of the magnetic yoke 31, thereby improving the vibration performance of the multifunctional sounding device 100 in the present invention.

In the embodiments of the present invention, the multifunctional sounding device is provided with a through hole at a central position of the magnetic circuit system. Since magnetic flux lines in the middle region of the magnetic circuit system are less, magnetic energy product utilization of the magnetic circuit system is improved after the through hole is provided in the middle region of the magnetic circuit system, so that the acoustic performance of the multifunctional sounding device is good. The motor assembly is accommodated in the through hole, so that the overall thickness of the multifunctional sounding device is small, which is conducive to lighting and thinning of the multifunctional sounding device. The coil unit of the motor assembly is fixed to the housing, the coil unit is spaced apart from the magnetic circuit system and drives the magnetic circuit system to vibrate in the second direction, and the magnetic steel plate of the magnetic circuit system is used as the magnetic steel plate for providing driving force of the motor assembly, without adding additional magnetic steel plates, so that the magnetic steel plate of the magnetic circuit system is able to be reused, thereby enhancing the driving force of the motor assembly and making the vibration performance of the multifunctional sounding device good. In addition, the first direction is perpendicular to the second direction, so that the coil unit of the motor assembly has less influence on the driving force of the magnetic circuit system of the sounding unit in the first direction and less interference with each other, thereby achieving good acoustic performance and vibration performance of the multifunctional sounding device in the present invention.

The above description is merely some embodiments of the present invention, and it should be noted herein that those of ordinary skill in the art may make improvements without departing from the inventive concept of the present invention, all of which fall within the protection scope of the present invention.

What is claimed is:

1. A multifunctional sounding device comprising a housing having an accommodation space and a sounding unit fixedly accommodated in the accommodation space, the sounding unit comprising a basin frame and a vibration system and a magnetic circuit system having a magnetic gap respectively fixed to the basin frame, the vibration system being driven by the magnetic circuit system to vibrate and sound in a first direction, wherein the magnetic circuit system is elastically connected to the housing by a plurality of elastic arms, and the magnetic circuit system has a through hole at a central position; and the multifunctional sounding device further includes a motor assembly accommodated in the through hole, the motor assembly includes a coil unit fixed to the housing, and the coil unit is spaced apart from the magnetic circuit system and drives the magnetic circuit system to vibrate in a second direction, wherein the first direction is perpendicular to the second direction;

wherein the magnetic circuit system comprises a magnetic yoke fixed to the basin frame, a main magnetic steel plate fixed to the magnetic yoke, two secondary magnetic steel plates disposed on opposite sides of the main magnetic steel plate and spaced apart from the main magnetic steel plate to form the magnetic gap, a first soft magnetic steel plate in an annular shape, and a second soft magnetic steel plate in an annular shape; wherein a magnetic yoke center hole penetrating through the magnetic yoke is provided at a central position of the magnetic yoke;

the main magnetic steel plate is in an annular shape and encloses a guide space, the main magnetic steel plate is fixed to the magnetic yoke and disposed around the magnetic yoke center hole, and the guide space communicates with the magnetic yoke center hole to collectively enclose the through hole;

the secondary magnetic steel plates are disposed on opposite sides of the magnetic yoke; and the first soft magnetic steel plate is stacked and fixed on a side of the main magnetic steel plate away from the magnetic yoke, and the second soft magnetic steel plate is stacked and fixed on a side of a respective secondary magnetic steel plate away from the magnetic yoke.

2. The multifunctional sounding device according to claim 1, wherein the magnetic yoke further comprises a magnetic yoke body and two elastic arms respectively extending from opposite sides of the magnetic yoke body, the magnetic yoke center hole is disposed in the magnetic yoke body, and both the main magnetic steel plate and the secondary magnetic steel plates are fixed to the magnetic yoke body; and wherein the elastic arms are elastically connected to the housing and suspend the magnetic yoke body in the accommodation space.

3. The multifunctional sounding device according to claim 2, wherein the magnetic circuit system further comprises two auxiliary magnetic steel plates fixed on the other opposite sides of the magnetic yoke, the two auxiliary magnetic steel plates are respectively disposed on the other opposite sides of the main magnetic steel plate at intervals and correspond to positions of the two elastic arms, and the second soft magnetic steel plate is further stacked and fixed on a side of a respective auxiliary magnetic steel plate away from the magnetic yoke.

4. The multifunctional sounding device according to claim 2, wherein the motor assembly comprises a plurality of motor magnetic steel plates fixed on a side of the magnetic yoke body away from the housing, the plurality of motor magnetic steel plates are accommodated in the guide space, and the main magnetic steel plates are disposed around the plurality of motor magnetic steel plate.

5. The multifunctional sounding device according to claim 4, wherein two motor magnetic steel plates are provided, the main magnetic steel plate is in a rectangular shape, and the motor magnetic steel plates are respectively fixed on opposite sides of a short axis or a long axis of the main magnetic steel plate.

6. The multifunctional sounding device according to claim 5, wherein the coil unit comprises an iron core fixed to the housing and a coil wound around the iron core, the iron core is fixed to the housing and penetrates through the magnetic yoke center hole to be at least partially accommodated in the guide space; wherein the coil is spaced apart from the motor magnetic steel plates and the main magnetic steel plate, respectively, and drives the motor magnetic steel plates and the main magnetic steel plate to vibrate in the second direction; and wherein the motor assembly further comprises a plurality of mass blocks fixed to the magnetic circuit system, and the plurality of mass block are fixed to one or both of the magnetic yoke and the second soft magnetic steel plate.

7. The multifunctional sounding device according to claim 4, wherein the vibration system comprises a diaphragm fixed to the basin frame, a voice coil inserted into the magnetic gap to drive the diaphragm to vibrate and sound, an elastic support assembly connected to a side of the voice coil away from the diaphragm, and a skeleton configured to fix the voice coil to the diaphragm, and wherein the voice coil is in a rectangular shape, and a length difference between a length of a long axis of the voice coil and a length of a long axis of the main magnetic steel plate is greater than or equal to a maximum amplitude of a respective motor magnetic steel plate.

8. The multifunctional sounding device according to claim 7, wherein the vibration system further comprises a plurality of elastic members, one end of a respective elastic member is connected to the basin frame or the housing, and the other end of the respective elastic member is connected to the voice coil.

9. The multifunctional sounding device according to claim 1, wherein the main magnetic steel plate has an annular structure having a same thickness.

* * * * *